Patented Nov. 14, 1939

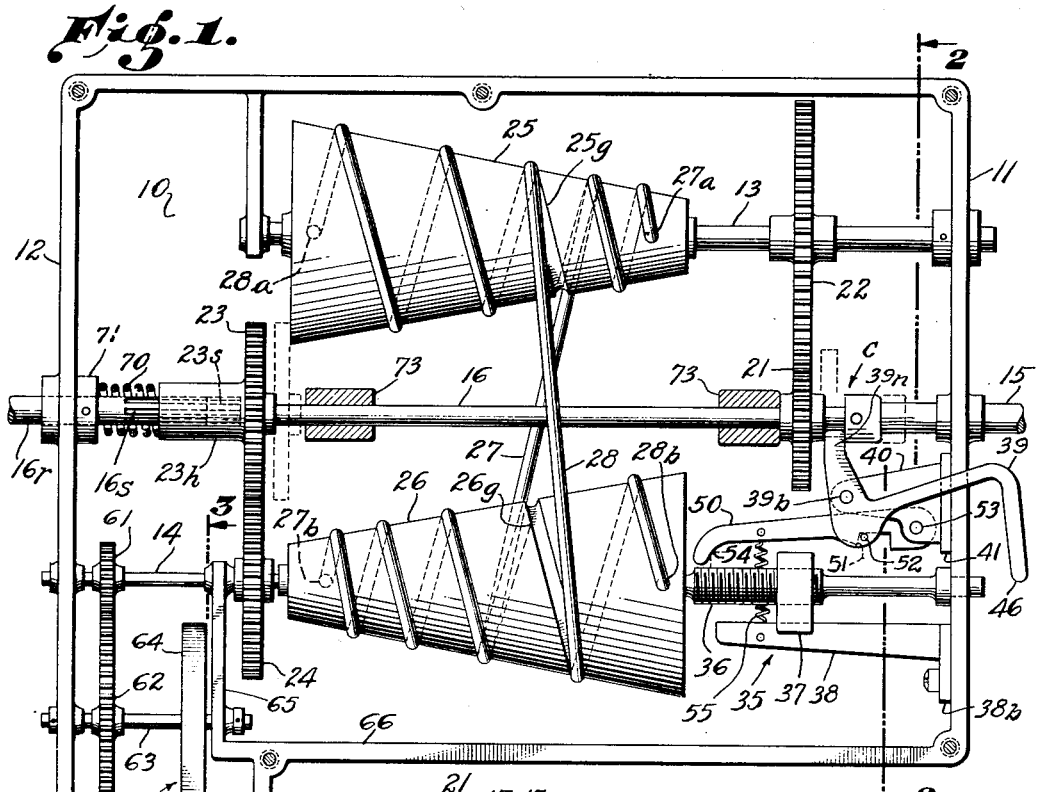

2,179,841

UNITED STATES PATENT OFFICE 2,179,841

POWER TRANSMISSION

Roy E. Cassidy, Los Angeles, Calif.

Application April 3, 1939, Serial No. 265,682

5 Claims. (Cl. 192—3.5)

This invention relates to a power transmission mechanism, and more particularly to that type of a mechanism of this character wherein an initial high driving speed and great resistance is gradually superseded by a slower driving speed and lessened resistance.

The invention is intended for use on self-propelled vehicles and in various other situations where a mechanism may be advantageously used which is capable of automatically changing from initial high speed and low power to a slower speed and greater power.

Among the objects of the invention are to provide an improved means to automatically throw into an inoperative position a means whereby higher speed and lessened power are initially secured, so after this part of the mechanism has done its work there will be established a direct driving connection between the source of power and the work to be done.

Other objects, advantages and features of invention will hereinafter appear.

Referring to the accompanying drawing, which illustrates what is at present deemed to be a preferred embodiment of the invention:

Fig. 1 is a general plan view of the structure the cover being omitted.

Fig. 2 is a cross section on line 2—2 of Fig. 1.

Fig. 3 is a cross section on line 3—3 of Fig. 1.

Fig. 4 is an enlarged, sectional detail of the clutch mechanism, taken on line 4—4 of Fig. 2.

Referring in detail to the drawing, mounted upon the base 10 is shown a front wall 11 and a rear wall 12, thus affording means to support rotatably a primary countershaft 13, secondary countershaft 14 and a transmission shaft between said countershafts and in parallelism with them. Said transmission shaft is made up of a front section 15 and a rear section 16, said two sections, relative to each other, being axially movable and at times rotationally fixed, this result being due to said shaft sections being operatively related to each other by the clutch structure C.

Said clutch structure C includes a sleeve 17 having at one end annular enlargement 17a, thus providing at its inner side an annular shoulder 17s. The rear shaft section 16, in a spaced relation to its front end, has around it a collar or annular rise 18 in a fixed relation thereto, and a gear 21 has a hub 21h furnished at one end with an internal annular shoulder 21s which is abuttable, with a working contact, against the rear side of said collar 18. A screw threaded connection is provided between the sleeve 17 and the inner surface of the outer part of the hub 21h, whereby, when said sleeve is screwed into said hub as far as possible a working fit results between the collar 18 and the parts at each side thereof. Through the enlarged front end portion 17a of the sleeve 17 extends a diametrical spline pin 19 which passes through a diametrical slot 20 through the rear end portion of the shaft section 15, said shaft end having a flared mouth portion 20a into which is fittable a correspondingly shaped extension 16x with which the front end of the rear shaft section 16 is furnished.

The driving pinion 21 is shiftable into and out of mesh with a gear 22 fixed to the primary countershaft 13, and near the opposite end of the rear shaft section 16 this shaft section has fixed to it a gear 23 which is simultaneously shiftable into and out of engagement with a gear 24 fixed to the secondary countershaft 14. A power receiving shaft 16r is mounted in a slidable, but rotationally fixed relation to the rear shaft section 16.

The gear 23, having the hub or sleeve portion 23h integral therewith, is fixedly secured to the shaft section 16. The power receiving shaft 16r is provided with a series of spline grooves 16s with which cooperate internal splines 23s of the hub 23h.

To the primary countershaft 13 is fixed a conical pulley 25 and to the secondary countershaft 14 is fixed a like pulley 26. One of said pulleys is tapered reversely to the other, and the two pulleys are disposed oppositely to each other and are provided with belt means, for example the cables 27 and 28 for transmitting power from the primary countershaft to the secondary countershaft.

The mechanism as a whole is intended to apply a given amount of horsepower to start, at a relatively slow speed and great initial resistance, a vehicle, machine or other utility, and then to adapt the speed of the driving means to the increasing speed of such vehicle or machine, etc. Hence the tapers of the conical pulleys are so arranged in relation to each other that, at first, the connection 28 which transmits power from the primary countershaft 13 to the secondary countershaft 14 leads from the small end portion of its pulley to the large end portion of the pulley on the secondary countershaft.

The connections 27 and 28, desirably steel cables, are arranged in such a manner that at the time the machine is started the connection 27 is wound in a helix upon the pulley 26 of the secondary countershaft 14 from end to end of said pulley, and one of its end portions extends from the lower side of the large end of said pulley to the lower side of the small end of the pulley 25 of the primary countershaft 13, opposite ends of said connection being secured to opposite pulleys. The other connection 28 is reversely arranged, being wound upon the pulley 25 of the primary countershaft 13 and passing from the upper side of the small end of said pulley to the upper side of the large end of the other pulley, at which point it is anchored, the opposite end of this connection being fastened near the large end of the pulley of said primary countershaft. The pulley 25 is provided with a helical groove 25g and the pulley 26 with a like groove 26g. These grooves are of a concave character, suited in size for the cables 27 and 28 to follow them. Only one groove is provided on each pulley, the two cables following each other in the winding and unwinding operations. The grooves 25g and 26g are shown as following identically shaped spirals, the distance between the adjacent spirals progressively decreasing as they approach the small end of the pulley in which the grooves are formed. The anchorage sockets of the cable 27 are designated 27a and 27b; those of the cable 28 are designated 28a and 28b.

Describing the automatically operable gear shifting means indicated in a general way by the reference numeral 35, upon one or the other of the countershafts, the shaft 14 in the embodiment shown, is axially secured an elongated screw threaded member 36, upon which is mounted in a screw threaded relation thereto a slotted collar 37. Said collar is kept from rotating by means of a guide arm 38 engaging its slot and having a basal portion 38b that is secured to the front standard 11. When the member 36 is rotated said collar slides along said guide arm, moving longitudinally of said member 36 by reason of its screw threaded relation thereto.

An angular gear shift lever 39 is pivotally mounted at 39b upon a bracket 40 having a base portion 41 whereby it is secured to the front wall 11. At one side of its pivot said lever is furnished with an arm 39n whereby it is operatively connected with the front portion of the rear transmission shaft section 16, a deflected part of said arm occupying the space between the gear hub 21h and the shoulder 17s of the sleeve 17. The lever 39 is provided with a deflected handle means 46 at the side of its pivot opposite to the shaft.

When the apparatus is first put into operation the lever 39 will ordinarily be locked against manual operation by a latch arm 50 having a shoulder 51 against which abuts a pin 52 carried by said lever. Said latch arm is pivoted at one end to the bracket 40 by a pivot 53, and at its opposite end has a cam portion 54 positioned to be acted upon by the collar 37 for the purpose of swinging said latch arm in a direction to release its latch shoulder 51 from the pin 52 carried by the lever 38, thus releasing said lever for manual operation. A spring 55, acting between the arm 38 and the latch arm 50 tends to hold said latch arm in the latched position. Spacing pins 56 hold said spring 55 out of the path of moving parts.

If, at the time the lever 38 is automatically released as aforesaid, the operator is applying pressure to the handle 46 of said lever in a rearward direction, this will cause the rear transmission shaft section 16 to be shifted forwardly, thus disengaging its gear 23 from the gear 24 and its pinion 21 from the gear 22. Thereupon a spring-driven resetting means, indicated in a general way at 60, will cause the countershafts 14 and 13 to be rotated reversely until the cable carried by their conical pulleys is wound back to its original position, from which it has moved a short distance as shown in Fig. 1, and the shafts 16 and 16r will be directly driven from the source of power.

Describing now the various parts of the restoring or rewinding mechanism 60, to the rear end portion of the secondary countershaft 15 is fixed a pinion 61 with which continually meshes a gear 62. This gear is fixed to a shaft 63 which is acted upon by a spiral spring 64 attached thereto. Said spring opposes clockwise (from the viewpoint of Fig. 3) rotation of the countershafts 15 and their pulleys. The shaft 63, to which the inner end of said spring 64 is secured, is supported at its rear end by the frame wall 12 and its front end portion is supported by an extension 65 of the adjacent side portion 66 of the main frame.

The rewinding mechanism 60 is in part housed by a housing 66x formed by an extension of the main casing. The free end of the spring 64 is anchored to a stub shaft 67 supported by arms extending from the casing extension 66x, or in any other desirable manner.

The rear transmission shaft section 16 is maintained under a pressure tending to urge it forwardly toward a position where its two gears (strictly speaking, gear and pinion) will both be disengaged from the gears which they, at times, rotate. For this purpose a compression spring 70 is shown acting between the hub 23h with which the gear 23 is furnished and a collar 71 on the rear end portion of said shaft section 16.

Suitable bearings 73 are provided for the shaft section 16, which terminates in the front part of the hub 23h. The spring 70, which presses against said hub, may be made strong enough to effect the shaft shifting operation without force being applied to the lever 39, or it may be made with only sufficient strength to aid the manual operation of said lever.

I claim:

1. In a power transmission mechanism, a main transmission shaft consisting of a rear section alined with and disconnectible from a front section, two countershafts one on each side of said transmission shaft in a parallel spaced relation thereto, two front gears for driving one of said countershafts from the front section of said transmission shaft, each of said countershafts having axially attached to it a tapered pulley, one of said pulleys tapering in the reverse direction to the other, flexible means connecting said pulleys, one of said countershafts being primary and the other secondary as to power transmission, said flexible means being arranged to permit initial relatively fast rotation of said primary countershaft in relation to said secondary countershaft and to progressively speed up the rotation of said secondary countershaft, two rear gears for driving the said rear section of said transmission shaft from said secondary countershaft, and gear shift means adapted simultaneously to disconnect the rear section of said transmission shaft from its front section thus placing said two front gears into mesh with each other and also placing said rear gears into mesh with each other, said gear shift means being also arranged to perform a connecting operation between said two shaft sections simutaneously with a disconnecting operation between said front gears and between said rear gears, and a spring means which, upon said shaft connecting operation taking place, automatically restores said countershafts and their pulleys to their original positions.

2. In a power transmission mechanism, a main transmission shaft rotatably supported, said shaft consisting of a front section and a rear section in alinement with each other, said rear section being axially movable and at times rotationally fixed in relation to said front section, a pinion and a gear in respect to rotation fixed to said rear shaft section, a primary countershaft having fixed to it a gear meshable with said pinion, a conical pulley concentrically fixed to said primary countershaft, a secondary countershaft in a parallel spaced relation to said primary countershaft, a conical pulley concentrically fixed to said secondary countershaft, said pulleys being tapered in opposite directions, belt means affording a power transmission between said pulleys whereby said secondary countershaft is drivable from said primary countershaft, a gear rotationally fixed to said secondary countershaft and meshing with the gear of the rear section of the transmission shaft wherever the pinion of the latter shaft is in mesh with the gear of the primary countershaft, an elongated screw threaded member carried concentrically by one of said countershafts and rotated thereby, an internally screw threaded collar mounted upon said screw threaded member, means for preventing rotation of said collar thereby causing it to be moved longitudinally of said screw threaded member by the rotation of the latter, gear shift means released by said collar in the final part of its movement for operation, whereby, after a predetermined number of rotations of said countershafts, the aforesaid rear shaft section is shifted, thereby simultaneously moving its gear and pinion to inoperative positions, recoil means operatively related to said countershafts to rotate them both back to their original positions upon the movement of said gear and pinion to inoperative positions as aforesaid, and mounting means whereby all of said shafts are rotationally supported.

3. In a power transmission mechanism, a main transmission shaft consisting of a rear section alined with and disconnectible from a front section, two countershafts one on each side of said transmission shaft in a parallel spaced relation thereto, two front gears for driving one of said countershafts from the rear section of said transmission shaft, each of said countershafts having axially attached to it a pair of longitudinally tapered driving members, one of said members tapering in the reverse direction to the other, a power transmission means connecting said members, one of said countershafts being primary and the other secondary as to power transmission, said power transmission means connecting said members being arranged to permit initial relatively fast rotation of said primary countershaft in relation to said secondary countershaft and to progressively speed up the rotation of said secondary countershaft in relation to the speed of rotation of said primary countershaft, two rear gears for driving the said rear section of said transmission shaft from said secondary countershaft, and gear shift means adapted simultaneously to disconnect the rear section of said transmission shaft from its front section while placing said two front gears into mesh with each other and into an operative relation to said front shaft section and also simultaneously placing said rear gears into mesh with each other, and at a later stage in the operation of the device to perform a connecting operation between said two shaft sections simultaneously with a disconnecting operation between said front gears and between said rear gears, and a spring means which, upon the latter disconnecting operations taking place, automatically restores said countershafts and their pulleys to their original positions.

4. The subject matter of claim 3 and, the members of said pair of longitudinally tapered driving members being tapered in a uniform manner.

5. In a power transmission mechanism, a main power transmission shaft consisting of a rear section rotationally connectible with and disconnectible from a front section, two countershafts one on each side of said rear shaft section in a parallel spaced relation thereto, one of said countershafts being primary and the other secondary in respect to power transmission, power transmission means operatively connecting said countershafts in such a manner as to cause said secondary countershaft to rotate slowly in relation to said primary countershaft when the mechanism begins to operate and to progressively speed up the rotation of said secondary countershaft in relation to the speed of said primary countershaft, power transmitting means for driving said primary countershaft from the front section of said main transmission shaft, power transmission means for driving the rear section of said main transmission shaft from said secondary countershaft, means adapted simultaneously to rotationally disconnect the rear section of said main transmission shaft from its front section while putting into an inoperative condition both of said power transmission means, said disconnecting means also being operable to restore a rotational connection between the two sections of said main transmission shaft and simultaneously place both of said power transmitting means in an inoperative condition, an elongated screw threaded member carried concentrically by one of said countershafts and rotated thereby, an internally screw threaded collar mounted upon said screw threaded member, means for preventing rotation of said collar thereby causing it to be moved longitudinally of said screw threaded member by the rotation of the latter, a lever to operate said disconnecting means after a predetermined number of rotations of said countershafts, means whereby said collar in the final part of its movement releases said lever, and a recoil means, which upon the aforesaid restoring of a rotational connection between the two sections of said main transmission shaft, automatically restores said countershafts to their original positions.

ROY E. CASSIDY.